(12) United States Patent
Probasco

(10) Patent No.: US 7,581,110 B1
(45) Date of Patent: Aug. 25, 2009

(54) KEY DISTRIBUTION FOR ENCRYPTED BROADCAST DATA USING MINIMAL SYSTEM BANDWIDTH

(75) Inventor: Scott Probasco, Bedford, TX (US)

(73) Assignee: Nokia Corporation, Espoo (FI)

( * ) Notice: Subject to any disclaimer, the term of this patent is extended or adjusted under 35 U.S.C. 154(b) by 505 days.

(21) Appl. No.: 09/645,376

(22) Filed: Aug. 24, 2000

Related U.S. Application Data

(60) Provisional application No. 60/150,732, filed on Aug. 25, 1999.

(51) Int. Cl.
*H04L 9/32* (2006.01)

(52) U.S. Cl. ............ 713/181; 713/153; 713/170; 380/262; 380/282; 726/30

(58) Field of Classification Search .......... 380/210, 380/239, 273, 270, 278, 283, 44, 211, 271, 380/262, 282; 713/153, 160, 170, 171, 181; 455/410, 411; 726/30
See application file for complete search history.

(56) References Cited

U.S. PATENT DOCUMENTS

| | | | |
|---|---|---|---|
| 5,073,935 A * | 12/1991 | Pastor | 380/30 |
| 5,282,249 A * | 1/1994 | Cohen et al. | 380/229 |
| 5,493,614 A | 2/1996 | Chaum | |
| 5,764,765 A | 6/1998 | Phoenix et al. | |
| 5,768,276 A | 6/1998 | Diachina et al. | |
| 5,870,474 A * | 2/1999 | Wasilewski et al. | 380/211 |
| 6,005,938 A * | 12/1999 | Banker et al. | 380/239 |
| 6,105,134 A * | 8/2000 | Pinder et al. | 713/170 |
| 6,424,717 B1 * | 7/2002 | Pinder et al. | 380/239 |
| 6,480,831 B1 * | 11/2002 | Cordery et al. | 705/60 |
| 6,526,508 B2 * | 2/2003 | Akins et al. | 713/168 |
| 6,748,080 B2 * | 6/2004 | Russ et al. | 380/239 |
| 6,880,081 B1 * | 4/2005 | Itkis | 713/163 |

FOREIGN PATENT DOCUMENTS

| | | |
|---|---|---|
| WO | WO 98/52318 | 11/1998 |
| WO | WO 99/04583 | 1/1999 |
| WO | WO 99/07150 | 2/1999 |
| WO | WO 99/27712 | 6/1999 |
| WO | WO 99/35801 | 7/1999 |
| WO | WO 99/63757 | 12/1999 |
| WO | WO 99/66670 | 12/1999 |
| WO | WO 00/56105 | 9/2000 |
| WO | WO 00/59252 | 10/2000 |

OTHER PUBLICATIONS

D. Wallner et al.: Network Working Group, Request For Comments 2627, Jun. 1999.*

\* cited by examiner

*Primary Examiner*—Matthew B Smithers
*Assistant Examiner*—Paul Callahan
(74) *Attorney, Agent, or Firm*—Alston & Bird LLP

(57) ABSTRACT

This invention provides a bandwidth-efficient mechanism whereby the source or originating node(s) (the invention supports multiple source nodes, each creating single or multiple broadcast message(s)) may utilize broadcast addressing service to efficiently reach multiple receiver nodes and still control which receiver node(s) may access the broadcast data or message. This method is realized by a novel and efficient key distribution technique.

14 Claims, 4 Drawing Sheets

KEY DISTRIBUTION FOR ENCRYPTED BROADCAST DATA USING MINIMAL SYSTEM BANDWIDTH

RELATED APPLICATIONS

Applicant claims benefit of earlier filed U.S. Provisional Application No. 60/150,732 filed on Aug. 25, 1999, on behalf of Scott Probasco entitled "KEY DISTRIBUTION FOR ENCRYPTED BROADCAST DATA USING MINIMAL SYSTEM BANDWIDTH."

BACKGROUND OF THE INVENTION

This invention relates generally to communication networks and, more particularly a key distribution system for a broadcast network.

Modern communications systems may include a type of delivery service known as "broadcast" addressing wherein a single source node broadcasts information or messages (i.e. data) to multiple receiver nodes by sending a single instance of the data or message. This type of service uses efficient addressing mechanisms to deliver a single delivery instance of the data to multiple receiver nodes using minimal system resources or bandwidth. Broadcast addressing is achieved by using a special code in the address filed of message (or data packet). The originator, or source, of the data may desire to use this efficient broadcast addressing mechanism to deliver the data, but still be able to control access to the data such that only authorized receiver nodes may interpret the data. A common method to control access to data is to encrypt the data at its source. Only receiver nodes possessing the correct key to decrypt the data are able to interpret the data, and access is thus controlled.

Some broadcast systems also support a subset transmission mode referred to as "multicast" addressing wherein the transmission is to a subset of the machines on a network.

FIG. 1 shows a typical communication system. Network 100 may comprise Broadcast Server(s) 110 as a single source node, Database 115 coupled to Broadcast Server(s) 110, Internet 120 to which broadcast service is coupled. Network 100 also comprise various receiver nodes such as: Mobile Switching Center (MSC) 130 which is coupled to a plurality of Base Stations 150, each Base Station 150 may be in wireless communication with a plurality of Mobile Stations 160. A plurality of MSCs and their associated Base Stations made form a host cellular network. Other nodes may include Network Access Point 190, which may be a server, gateway, bridge, or router providing access to the Internet for various devices 195. Another node to Network 100 may be a Public Service Telephone Network (PSTN) 170 which may provide an access point for various telephonic devices 180.

In a dynamic environment, a problem exists to efficiently maintain the list of authorized receiver nodes (those nodes having the correct key). Of particular interest is the ability to update the list of authorized receiver nodes (add or delete members) without impacting the entire population of authorized receiver nodes.

For example, a news delivery service might wish to deliver news headlines on a periodic basis to authorized receiver nodes who have negotiated a subscription. In this case, the news delivery service (or source of the data) would encrypt the data so that interpretation of the data is limited to those receiver nodes who have negotiated a subscription (and therefore have been provided with the key to the data). When additional receiver nodes acquire a subscription, these nodes must be provided access to the data (or decryption key) without disturbing the access of other receiver nodes. Also, when a receiver nodes' subscription is no longer valid, the capability must exist to discontinue the receiver nodes' access to the data (or decryption key) without disturbing the access of other receiver nodes.

Thus, there is a need to provide a bandwidth efficient distribution technique for a source of material to manage the broadcast of said material over a network to multiple users in a secure manner.

SUMMARY OF THE INVENTION

This invention provides a bandwidth-efficient mechanism whereby the source or originating node(s) (the invention supports multiple source nodes, each creating single or multiple broadcast message(s)) may utilize broadcast addressing service to efficiently reach multiple receiver nodes and still control which receiver node(s) may access the broadcast data or message. This method is realized by a novel and efficient key distribution technique

DETAILED DESCRIPTION

Modern communications systems may be described in an abstract manner by a series of layers defining protocol hierarchies or stacks. Network architectures are organized in layers in order to reduce design complexity. Each layer provides services to the layer above it, thus protecting the above layers from the details of actual implementation of the provided services. A layer on one machine communicates with the corresponding layer on another machine. Each layer has a plurality of protocols which are the rules and methods of communication. Herein the applicant defines the term plurality to mean one or more.

One example of a network architecture organized as a stack is the Open Systems Interconnection (OSI) Reference Model. The most common example of a protocol stack is the TCP/IP Reference Model. A treatment of the TCP/IP model may be found in *TCP/IP Illustrated, Volume* 1, 2, 3 by W. Richard Stevens (Addison-Wesley) incorporated herein by reference. Other reference models include Wireless Application Protocol (WAP)—which will be discussed below—and Broadband Integrated Services Digital Network (B-ISDN).

Figure 2:
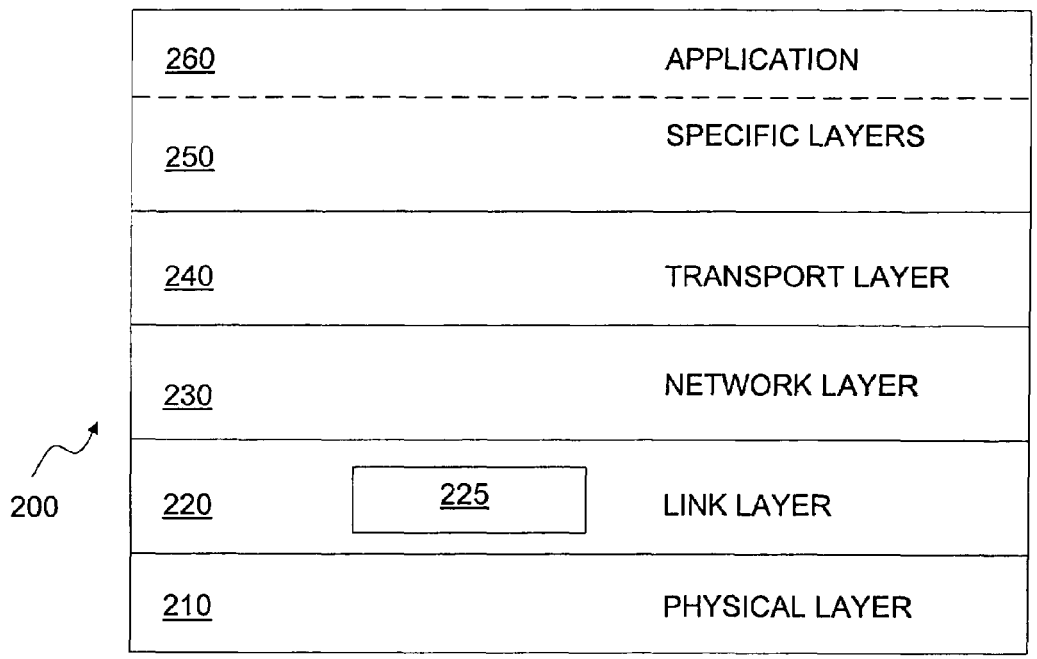
FIG. 2 is an illustration of a typical protocol stack.

FIG. 2 is an illustration of a typical "bottom up" reference model 200 comprising Physical Layer (Layer 1) 210, Link Layer (Layer 2) 220, Network Layer (Layer 3) 230, Transport Layer (Layer 4) 240, and a plurality of application specific layers above the other layers (Layer 4+) 250, 260 . . . .

Physical Layer 210 deals with the electrical, mechanical, procedural interfaces between the physical transmission medium, which lies below the physical layer, and the layers above Physical Layer.

Link Layer 220 organizes the data coming from Physical Layer 210. Link Layer 220 may break the data stream into data frames by creating frame boundaries. This is done by attaching special bit patterns to the beginning and ending of the frame. It is in Link Layer 220 where broadcast networks must deal with controlling access to the shared channel. This is dealt with by Medium Access Sublayer 225.

Network Layer 230 controls the routing of the messages or data packets from a source node to a destination node and controlling the operation of the subnet. A protocol in the network layer of the TCP/IP model in Internet Protocol (IP).

Transport Layer 240, among other duties, determines the type of service. In the case of the present invention, the service is a broadcast type or a multicast type service. Transport Layer 240 accepts messages or data from the upper layer, splits the data into smaller units, if needed, and sends them to Network Layer 230. Two protocols in this layer in the TCP/IP model are Transmission Control Protocol (TCP) and User Datagram Protocol (UDP).

Application Layers 250, 260 . . . may be various protocols that may be needed such as File Transfer Program (FTP), HyperText Transfer Protocol (HTTP), NNTP—a protocol for moving news articles, directory lookup, e-mail and the like.

Various embodiments of the invention allow for encryption of the source data at the application layer, transport layer, and network layer.

The destination nodes of the broadcast network may also comprise wireless devices known as mobile stations. A reference model based on the TCP/IP model called Wireless Application Protocol (WAP) was developed to address the screen size and bandwidth limitations of these mobile stations. A full-treatment of Wireless Application Protocol (WAP) may be found at http://www.wapforum.org.

Figure 3:
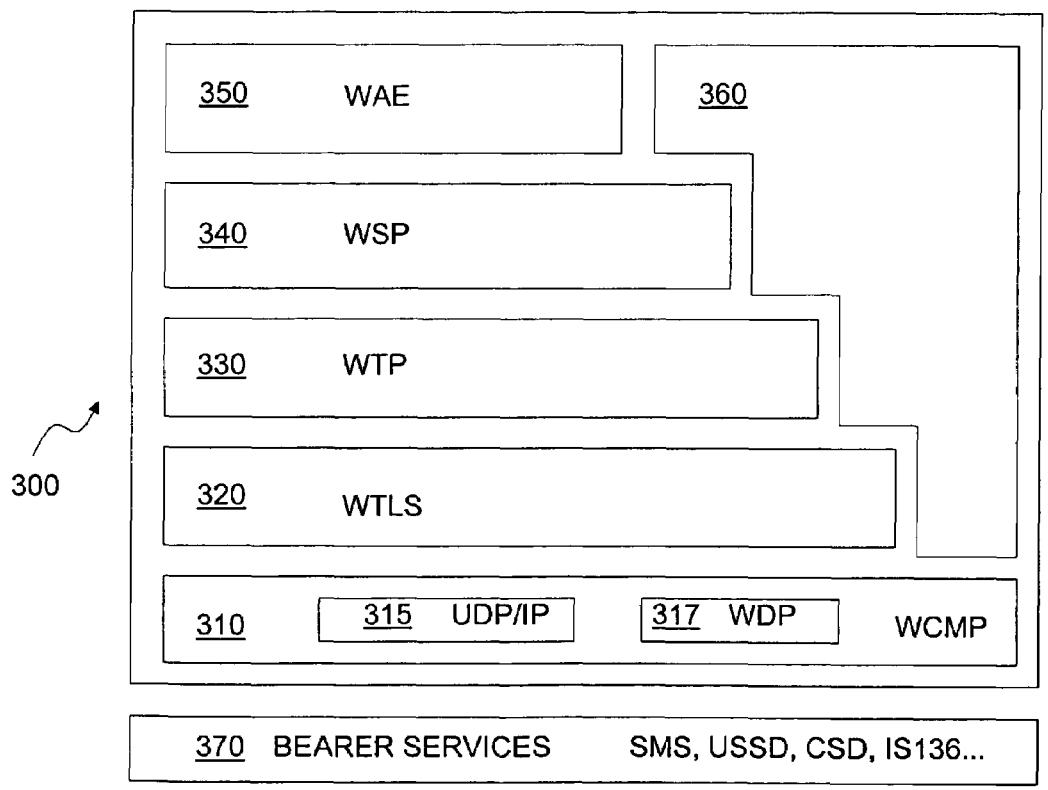
FIG. 3 is an illustration of a Wireless Application Protocol (WAP) stack.

FIG. 3 is an illustration of the network architecture for WAP. WAP Protocol Stack 300 comprises Transport Layer (WDP) 310, Security Layer (WTLS) 320, Transaction Layer (WTP) 330, Session Layer (WSP) 340, Application Layer (WAE) 350, and other services and applications 360. WAP Protocol Stack also provides Bearer Services Layer 370 for services such as Short Message Service (SMS), Code Division Multiple Access (CDMA), Cellular Digital Packet Data (CDPD) and the like.

The names provided for the layers in the WAP architecture is: Wireless Datagram Protocol (WDP), Wireless Transport Security (WTLS), Wireless Transaction Protocol (WTP), Wireless Session Protocol (WSP), Wireless Application Environment (WAE).

The various reference models are provided as exemplars only. The embodiments of the present invention may be utilized in other network architecture. Therefore, the layer names below do not refer to specific architectures unless noted otherwise.

Application Layer

In a first embodiment of the invention, a method in accordance with the invention is applied at the "application" or "Teleservice" layer of a protocol stack in a communications system. A source node, such as Broadcast Server(s) 110 described above in FIG. 1, encrypts the message(s) to be broadcast with an encryption key. A single encryption key may be used for all messages, or different encryption keys may be used for different groups of messages or even a unique encryption key used for each unique message. If any additional network entity is to have authority to grant access to the encrypted messages, each encryption key(s) is sent, by any secure means, to this authorized entity. An example of such an authorized entity is host cellular network(s) as was described in FIG. 1 above. At the source node, each encryption key is "hashed" through techniques known by those skill in the art, such as a common one-way or trap-door function, to provide a hash representation of the encryption key. A trap-door function is one in which any party can compute the function, but only the intended receiving can compute the inverse function. Each encrypted message and the hash of the it's encryption key are delivered from the source node to multiple users via broadcast delivery service.

Figure 1:
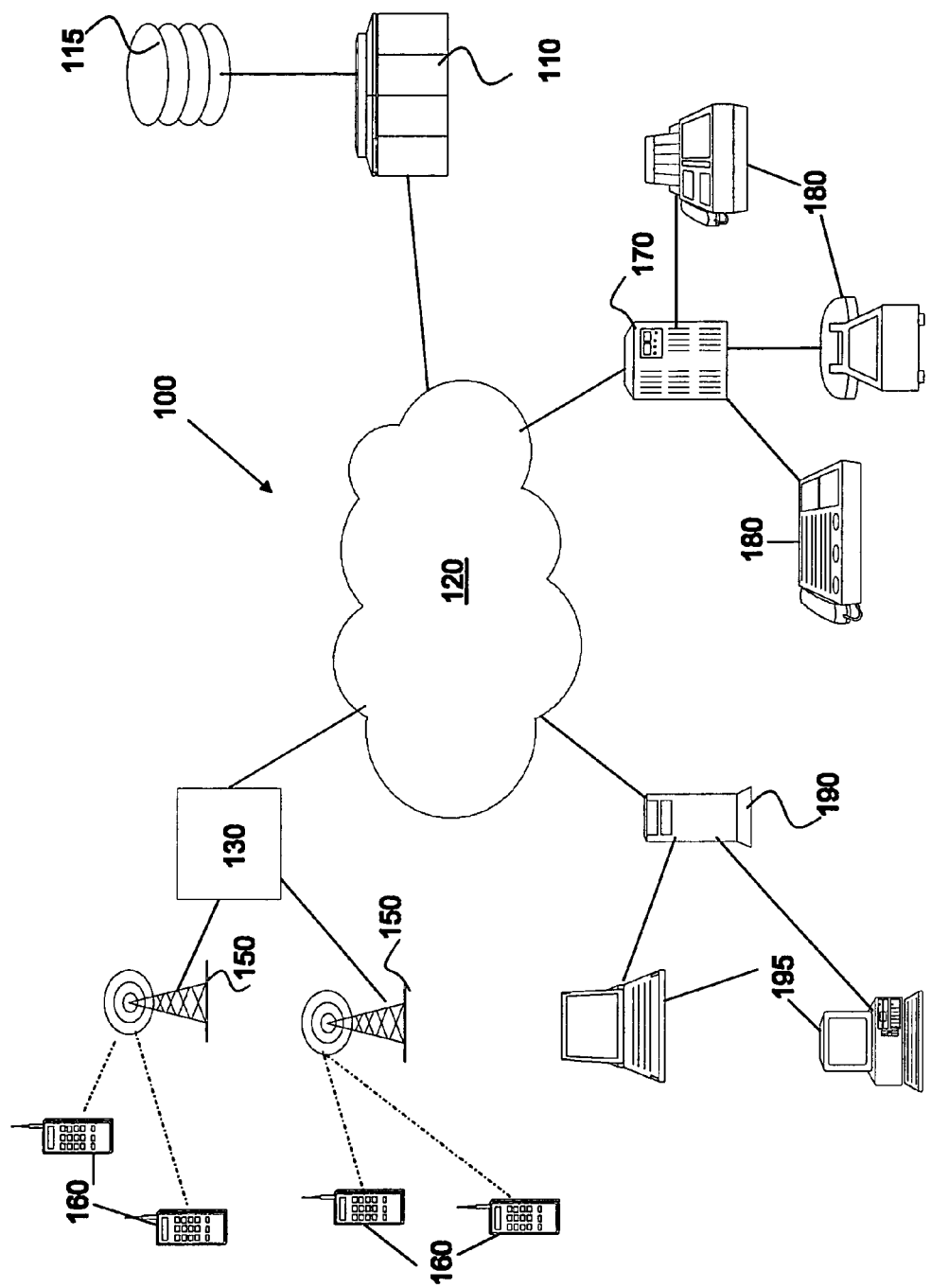
FIG. 1 is an illustration of a typical broadcast network.

Any of the multiple receiving nodes may process the received message in the method described as follows referring to FIG. 4 and FIG. 1. The receiving node may be end-user equipment supporting encryption such as Mobile Station 160, computing terminals 195 or telephonic devices such as fax, telephone and the like 180 of FIG. 1. The receiving node may also be a node away from the end-user such as MSC 130, Base Station 150, Access Points 190 and 170 of FIG. 1.

Figure 4:
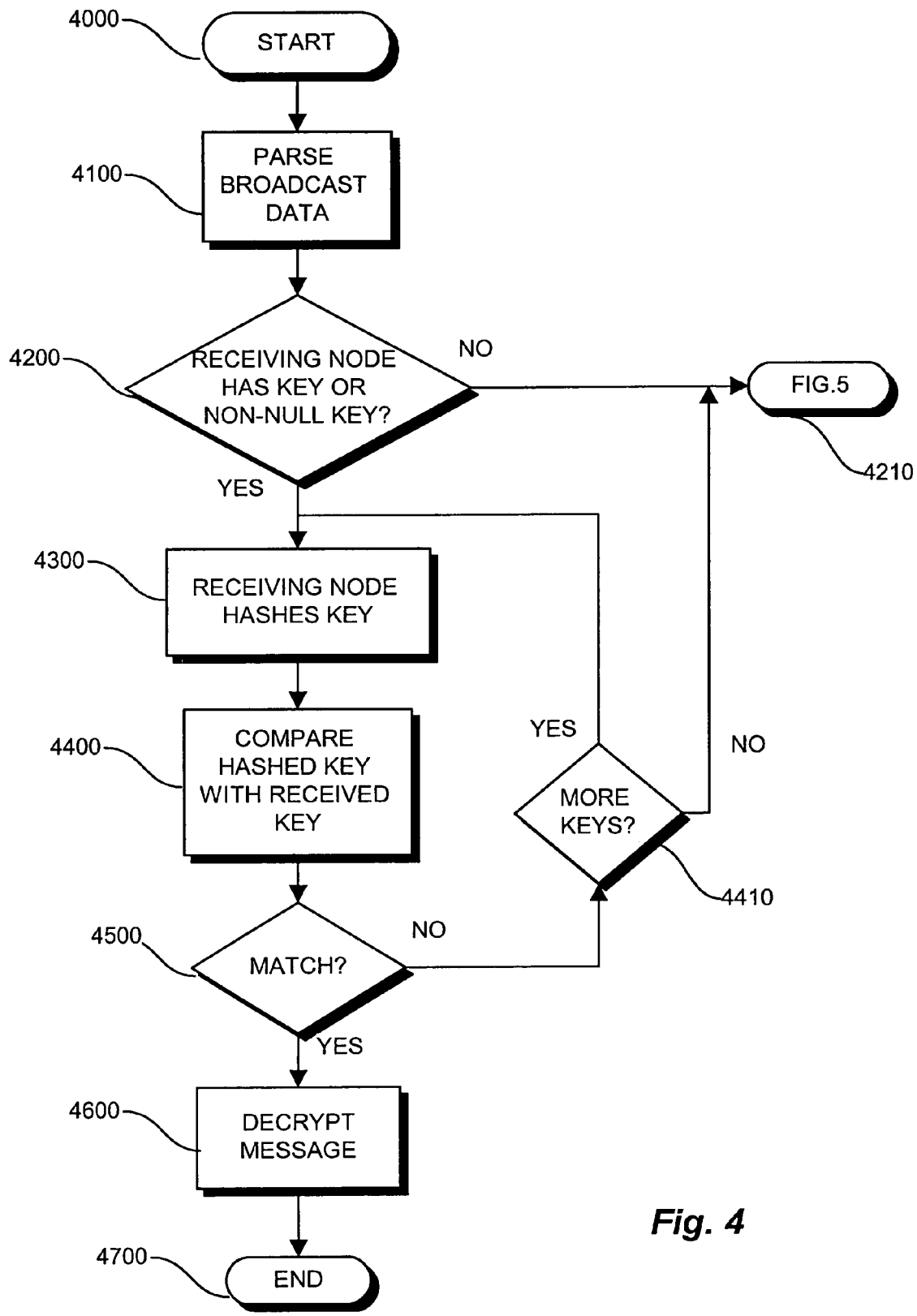
FIG. 4 is a flowchart showing the steps of a processing keys in accordance with embodiments of the invention.
Figure 5:
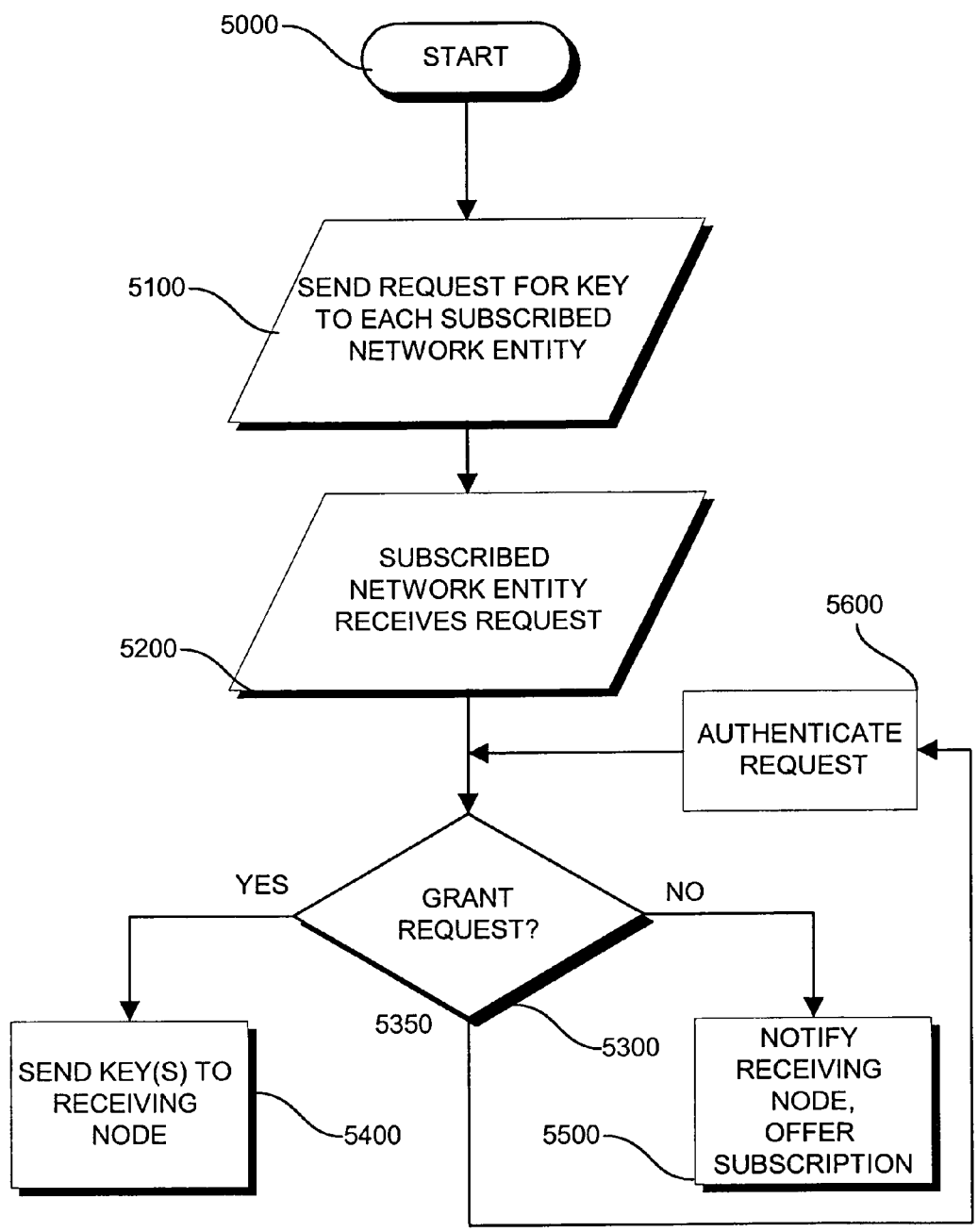
FIG. 5 is a flowchart showing the steps of requesting keys in accordance with embodiments of the invention.

Referring now to FIG. 4. The method starts at step 4000 when receiving node receives data. At step 4100, the receiving node parses the broadcast data to identify an encrypted message and its' hashed key. The receiving node determines if it has a key or a non-null key (step 4200). If the receiving node has no key(s) or possesses a NULL key to decrypt the message(s), the receiving node may request a key as will be described below and as is shown in FIG. 5 (4210). If the receiving node has one or more non-NULL keys, the receiving node examines each key it possesses in turn to determine a key match. The method continues with the examination steps. At step 4300, the receiving node hashes one of its own key (using the same one-way or trap-door function as the source node) and compares the result with the received hashed key (step 4400). If there is not a match 4500 and the receiving node has additional keys 4410 the process returns to step 4300 and repeat steps 4300 to 4410 until the receiving node has no compared keys remaining. If none of the key hashes match, the receiving node does not possess a valid key; the receiving node may request a key using method described below and shown in FIG. 5 (step 4210). If one of the key hashes do match, the receiving node does possess the proper key and may decrypt the message(s) (step 4600). The above is to be used as exemplar only variations and modifications may become known to those skilled in the art after reading the specification. Such variations and modifications are deemed to be within the spirit and scope of the invention.

For example, the receiving node may hash all its keys at step 4300 and then compare its hashed keys with the received key.

Referring to FIG. 5, when the receiving node wishes to request a key (either doesn't have a key or doesn't have the correct key), a request may be sent to each network entity which has granted a subscription to the receiving node (step 5100). This may include a key request directly to the source node. The request may ask for all keys the subscription is entitled to or specific keys depending upon the subscription (e.g. all updated keys, all keys issued or changed after a specific date and time, or a specific key). At step 5200, the network entity receives the request. At step 5300, a decision to grant the request or deny the request is made. At step 5300, more information may be required 5350, if the subscribed network entity does not recognize the requestor. Therefore, the process flows to step 5600 to uses processes known in the art to authenticate that the request is from an authorized receiver node before determining whether to grant or deny the request. If the request is granted, the network entity may send the key(s) to the receiver node by any secure means (step 5400). If the request is denied, the network entity may notify the requesting node (step 5500).

At any time, a network entity with authority over the subscription may desire to add receiver nodes to the list of authorized recipients, or augment the subscription of a receiver node. This is accomplished by sending the new key(s) to the receiver node. In this instance, the network entity would send an unsolicited key update message(s) to provide the receiver node with the appropriate key(s) for the subscription. At any time, a network entity with authority over the subscription may desire to remove a receiver node from the list of authorized receivers. This is accomplished by updating the receiver node with a new key value (set to a known "NULL" value). In this instance, the network entity would send an unsolicited key update message(s) to either replace or amend the receiver node key list for the specific subscription with the contents of the message(s). Compliant receiver nodes will replace or amend the key list according to the update message(s).

The complexity of the above method increases as the number of encryption keys increases. For each encrypted message the receiving node processes, the receiving node must compare the hash of each encryption key in its possession to the received hash to determine if the received message can be decrypted. Another embodiment of the invention may be realized by introducing the concept of "categories" of messages.

A source node encrypts the message(s) to be broadcast with an encryption key. A single encryption key may be used for all messages, or different encryption keys may be used for different groups of messages or even a unique encryption key used for each unique message. Each unique encryption key is associated with a category. More than one encryption key may be associated with the same category. If any additional network entity is to have authority to grant access to the encrypted messages, each encryption key(s) and associated category are sent, by any secure means, to this authorized entity—for example a host cellular network(s) as shown in FIG. 1. At the source node, each encryption key is "hashed" through a common one-way or trap-door function to provide a hash representation of the encryption key. Each encrypted message, the hash of the its encryption key, and the associated category of the encryption key are delivered from the source node to multiple users via broadcast delivery service.

Any of the multiple receiving nodes may process the received message using the method shown in FIG. 4 with the modification of the key(s) being associated with a category. Said modified method is as follows. The receiving node parses the broadcast data to identify an encrypted message, its hashed key, and the associated category. If the receiving node has no key(s) or possesses a NULL key associated with the category, the receiving node may request a key which is associated with the category as will be described below in association with FIG. 5. If the receiving node has one or more non-NULL keys associated with the category, the receiving node may examine each key it possesses for that category in the following way to determine a key match: the receiving node hashes its own key(s) associated with the category (using the same one-way or trap-door function as the source node) and compares the result(s) with the received hashed key. If none of the key hashes match, then the receiving node does not possess a valid key to decrypt the message(s). Therefore, the receiving node may request a key in a method as described below in association with FIG. 5. If one of the key hashes do match, the receiving node does possess the proper key and may decrypt the message(s).

Variations and modifications may become known to those skilled in the art after reading the specification. For instance, the receiving node may hash all its keys and then compare its hashed keys with the received key to determine if the receiving node has any keys associated with the hashed category.

The following method to request a key is similar to the description of FIG. 5 with the modification that the key(s) are associated with a category. When the receiving node wishes to request a key (either doesn't have a key or doesn't have the correct key), a request may be sent to any network entity which has authority over a subscription to the receiving node. This may include a key request directly to the source node. The request may ask for all keys the subscription is entitled to or specific keys depending upon the subscription (e.g. all keys associated with a specific category, all updated keys, all keys issued or changed after a specific date and time, or a specific key). The network entity receives the request, and may grant the request, deny the request, or initiate any processes to authenticate that the request is from an authorized receiver node before determining whether to grant or deny the request. If the request is granted, the network entity may send the key(s) and associated category to the receiver node by any secure means. If the request is denied, the network entity may notify the requesting node.

At any time, a network entity with authority over the subscription may desire to add receiver nodes to the list of authorized recipients, or augment the subscription of a receiver node. This is accomplished by sending the new key(s) and associated category to the receiver node. In this instance, the network entity would send an unsolicited key update message (s) to provide the receiver node with the appropriate key(s) and associated category for the subscription. At any time, a network entity with authority over the subscription may desire to remove a receiver node from the list of authorized receivers. This is accomplished by updating the receiver node with a new key value (set to a known "NULL" value) and its' associated category. In this instance, the network entity would send an unsolicited key update message(s) to either replace or amend the receiver node key and its' associated category list for the specific subscription with the contents of the message (s). Compliant receiver nodes will replace or amend the key and associated category list according to the update message (s).

Note that the Basic Method and Optimized Method may be combined in a single implementation. In this implementation, the Optimized Method is used, and any encryption keys which are not explicitly associated with a category implicitly belong to the same, "unlisted" or "unspecified" category. The Basic Method is seen to be a subset of the Optimized Method, where all encryption keys belong to a single, implicit category.

Transport Layer Method

Another embodiment of the invention is applied at the Transport Layer in a communications system. An application or "Teleservice," in a source node, defines an application message(s) or data unit(s) to be broadcast. The application message(s) contains more data than the transport path to the destination communication system can transmit in a single unit. This transport path may comprise of one or more logical blocks, not necessarily co-located, and may or may not include components in more that one data communications systems. In this instance, the application message(s) must be segmented by the communications system at the source node and then reassembled at the receiver node before the application message(s) are delivered to the application. A Teleservice Segmentation and Reassembly (TSAR) function may provide encryption of each segment of data as an implementation option.

For an efficient implementation of a Transport Layer or TSAR function, the overhead information of the Transport Layer or TSAR function is described and transported once for an entire Teleservice Message as header information from the Transport Layer or TSAR function. Indication of encryption and the Hash of the encryption key may be included in the Transport Layer or TSAR header information. In this instance, both the Application Layer Method Basic Method and Application Layer Method Network Layer Method An additional embodiment of the invention may be applied at the Network Layer in a communications system. One node of communications network, e.g. a Gateway or Switch function, receives incoming data that is addressed to multiple receiver nodes in the communications network via broadcast addressing. For a variety of reasons (subscription, liability, content), the controlling entity of the communications system may wish to restrict access to this information to authorized receiver nodes, independent of the restrictions implemented by the source(s) of the incoming data.

At the Network Layer, typical implementations of a communications system use a "wrapper" data element to contain "higher layer" data and Network Layer addressing and control data (e.g. an R-Data message or SMDPP message in certain communications systems), and thus delivers this "wrapper" data element intact to receiver nodes. In this instance, both the embodiments of the invention implemented at the Application Layer as described above, may be applied at the Network Layer to restrict access to the "higher layer" data to a subset of authorized receiver nodes when broadcast addressing is used.

Alternative to the Hash or Trap-Door Function

In the above embodiments, the encryption key itself is transformed by a Hash or Trap-door function so that this Hash of the encryption key may be transported over a potentially non-secure communications path. The "strength" of the protection provided is a function of the length of the key and strength of the Hash function. The longer the key the stronger the protection. The more mathematically strong the Hash function, the stronger the protection. This additional strength requires additional implementation complexity in the form of bandwidth to transport the Hash of the encryption key and additional computing power to compute the Hash of the key. The choice of strength versus complexity is an implementation choice.

A less complex method can be utilized in place of the encryption key Hash. In this method, the source node selects an encryption key(s) according to any method. This encryption key(s) is used to encrypt the source message(s). The source node sends the encryption key and an associated "tag" to any network entity with authority over the subscription, by any secure means. The encrypted message and its' associated tag are delivered from the source node to multiple users via broadcast delivery service.

This alternative encryption key identification scheme can be optimized by subdividing the tag field to include a source node identifier as well as an encryption key tag field. In this way, large numbers of source nodes can exist in the same communications system without coordinating the assignment of tag identifiers. This alternative is seen to be applicable to all methods discussed above.

The above embodiments may be augmented to provided additional functionality with reduced system overhead by including with the encryption key a "timer" value which indicates how many time-units the key may be used before compliant systems replace the key with a known "NULL" value. A particular embodiment of this method would allow temporary additions to the list of authorized receiver nodes for a predetermined time period with zero system resources or overhead required to remove the receiver node from the list after a trial or introductory period.

It is seen that the invention supports delivery of encrypted broadcast messages at various layers of the protocol stack. A basic method to provide the encryption key(s) to each member of the authorized receiver node list is to send the encryption key(s) to each authorized receiver node on the list in a point to point addressed secure message. While individual receiver nodes may be added to the list without undue burden on system throughput and capacity, removing a receiver node from the list may only be accomplished by sending a point to point addressed secure message with the new encryption key(s) to every remaining authorized receiver node on the list. This is seen to be an inefficient and poor use of system capacity and bandwidth. This invention describes methods which allows the host communication system or source node (any network entity with authority over the subscription) to add or remove individual receiver nodes from the list of authorized receiver nodes with minimal impact on system resources and capacity. These methods provide a fully functional key distribution system for broadcast addressing with minimal system overhead requirements, has the flexibility to be applied to any communications system, at multiple layers of the protocol stack.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter. The applicant herein defines "plurality" to be one of more.

What is claimed is:

1. A method for sending secure messages in a broadcast network comprising the steps of:
    encrypting data with a key;
    hashing said key;
    combining said encrypted data and said hashed key in a broadcast message that is structured so as to be capable of being decrypted by each of a plurality of wireless receiving nodes;
    wirelessly transmitting said broadcast message to the plurality of wireless receiving nodes; and
    removing at least one node from the plurality of wireless receiving nodes by transmitting a message including a NULL key to the node to be removed with the message configured such that the node to be removed replaces said key with the NULL key so that the removed node is thereafter unable to decrypt a broadcast message encrypted with said key.

2. The method of claim 1 wherein the key is one of a plurality of different keys and said steps of combining and transmitting comprises:
    combining said encrypted data with each one of said plurality of different keys in a plurality of broadcast messages; and
    transmitting one of the plurality of broadcast messages to a subset of said plurality of receiving nodes.

3. The method of claim 2 wherein each one of said plurality of different keys is associated with a respective category of messages.

4. The method of claim 1, wherein removing at least one node from the plurality of wireless receiving nodes comprises a broadcast server removing at least one node from the plurality of wireless receiving nodes by transmitting a message including a NULL key to the node to be removed with the message configured such that the node to be removed replaces said key with the NULL key so that the removed node is thereafter unable to decrypt a broadcast message encrypted with said key.

5. A method for decrypting a message received over a broadcast network comprising:
   receiving data comprising an encrypted message and a hashed key at a node in said broadcast network, wherein said node comprises means for storing data;
   parsing said data to derive said encrypted message and said hashed key;
   comparing said received hashed key with a plurality of keys that are prestored in said means for storing data in said node and to select a key having a hash matching said received hashed key;
   decrypting said encrypted message with said matching key if a match was found; and
   requesting a key from a network entity if no prestored key is found to have a hash that matches said received hashed key.

6. A method of claim 5 wherein receiving data comprises receiving the same data comprising an encrypted message and a hashed key at each of a plurality of nodes in said broadcast network, and wherein said parsing, comparing and decrypting are performed at each of the plurality of nodes in said broadcast network.

7. In a communications network having a plurality of network entities, a first one of the network entities comprising:
   a means encrypting data with a key;
   a means for hashing said key;
   a means for combining said encrypted data and said key in a broadcast message that is structured so as to be capable of being decrypted by each of a plurality of wireless receiving nodes;
   a means for wirelessly transmitting said broadcast message to the plurality of wireless receiving nodes; and
   a means for removing at least one node from the plurality of wireless receiving nodes by transmitting a message including a NULL key to the node to be removed with the message configured such that the node to be removed replaces said key with the NULL key so that the removed node is thereafter unable to decrypt a broadcast message encrypted with said key.

8. The network entity of claim 7 further comprising a means for distributing hashed keys.

9. A computer-readable memory having computer-readable program code portions stored therein for directing a computer to function in a particular manner when used by the computer, the computer-readable program code portions comprising:
   a first portion to direct the computer to encrypt data with a key;
   a second portion to direct computer to hash said key;
   a third portion to direct computer to combine said encrypted data with said hashed key in a broadcast message that is structured so as to be capable of being decrypted by each of a plurality of wireless receiving nodes;
   a fourth portion to direct computer to provide multiple wireless transmissions of said message; and
   a fifth portion to direct the computer to remove at least one node from the plurality of wireless receiving nodes by transmitting a message including a NULL key to the node to be removed with the message configured such that the node to be removed replaces said key with the NULL key so that the removed node is thereafter unable to decrypt a broadcast message encrypted with said key.

10. A computer-readable memory having computer-readable program code portions stored therein for directing a computer to function in a particular manner when used by the computer, the computer-readable program code portions comprising: a first portion to direct the computer to receive data comprising an encrypted message and a hashed key; a second portion to direct computer to parse said data; a third portion to direct computer to compare said received hashed key with a plurality of keys and to select a key having a hash matching said received hashed key; and a fourth portion to direct computer to decrypt said encrypted message with said matching key if a match was found and send a request for a key to a network entity if no matching key was found.

11. A computer-readable memory of claim 10 wherein said third portion is adapted to compare said received hashed key with a plurality of keys that have been prestored by the computer.

12. A computer program product comprising at least one computer-readable storage medium having computer-readable program code portions stored therein, the computer-readable program code portions comprising: a first executable portion for parsing received data comprising an encrypted message and a hashed key to derive said encrypted message and said hashed key; a second executable portion for comparing said received hashed key with a plurality of keys that are prestored by a receiving node to select a key having a hash matching said received hashed key; and a third executable portion for decrypting said encrypted message with said matching key if a match was found and sending a request for a key to a network entity if no matching key was found.

13. A computer program product comprising at least one computer-readable storage medium having computer-readable program code portions stored therein, the computer-readable program code portions comprising computer readable code that instructs a computer to:
   encrypt data with a key;
   hash said key;
   combine said encrypted data and said hashed key in a broadcast message that is structured so as to be capable of being decrypted by each of a plurality of wireless receiving nodes;
   wirelessly transmit multiple transmissions of said broadcast message; and
   remove at least one node from the plurality of wireless receiving nodes by transmitting a message including a NULL key to the node to be removed with the message configured such that the node to be removed replaces said key with the NULL key so that the removed node is thereafter unable to decrypt a broadcast message encrypted with said key.

14. The computer product of claim 13 wherein the at least one computer-readable storage medium is selected from a group consisting of hard-disk, CD-ROM, DVD, floppy disk, flash memory and the like.

* * * * *

UNITED STATES PATENT AND TRADEMARK OFFICE
CERTIFICATE OF CORRECTION

PATENT NO.       : 7,581,110 B1                                    Page 1 of 1
APPLICATION NO.  : 09/645376
DATED            : August 25, 2009
INVENTOR(S)      : Michael Scott Probasco It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this

Fourteenth Day of September, 2010

David J. Kappos
*Director of the United States Patent and Trademark Office*